US009715447B2

(12) United States Patent
Lin et al.

(10) Patent No.: US 9,715,447 B2
(45) Date of Patent: Jul. 25, 2017

(54) METHOD FOR ADAPTIVELY MANAGING A SOLID STATE DRIVE, AND ASSOCIATED APPARATUS AND ASSOCIATED COMPUTER PROGRAM PRODUCT

(71) Applicant: Synology Incorporated, Taipei (TW)

(72) Inventors: Yi-Chun Lin, Tainan (TW); Hsuan-Ting Chen, Taipei (TW)

(73) Assignee: Synology Incorporated, Taipei (TW)

( * ) Notice: Subject to any disclaimer, the term of this patent is extended or adjusted under 35 U.S.C. 154(b) by 0 days.

(21) Appl. No.: 14/340,575

(22) Filed: Jul. 25, 2014

(65) Prior Publication Data

US 2015/0205717 A1    Jul. 23, 2015

(30) Foreign Application Priority Data

Jan. 22, 2014    (TW) .............................. 103102332 A

(51) Int. Cl.
 G06F 12/00    (2006.01)
 G06F 12/02    (2006.01)
 G06F 3/06    (2006.01)

(52) U.S. Cl.
 CPC .......... *G06F 12/0246* (2013.01); *G06F 3/061* (2013.01); *G06F 3/0614* (2013.01); *G06F 3/0652* (2013.01); *G06F 3/0653* (2013.01); *G06F 3/0659* (2013.01); *G06F 3/0679* (2013.01); *G06F 12/0253* (2013.01); *G06F 2212/7205* (2013.01)

(58) Field of Classification Search
 CPC ...... G06F 3/061; G06F 3/0652; G06F 3/0614; G06F 3/0653; G06F 3/0659; G06F 3/0679; G06F 12/0253; G06F 12/0246; G06F 2212/7205
See application file for complete search history.

(56) References Cited

U.S. PATENT DOCUMENTS

| 2012/0059976 | A1 | 3/2012 | Rosenband |
| 2012/0110249 | A1 | 5/2012 | Jeong |
| 2012/0144097 | A1 | 6/2012 | Hashimoto |
| 2013/0232290 | A1* | 9/2013 | Ish ..................... G06F 12/0246 711/103 |

FOREIGN PATENT DOCUMENTS

| CN | 1619507 A | 5/2005 |
| CN | 103412727 A | 11/2013 |
| KR | 1020130033046 | 4/2013 |
| TW | 201142603 | 12/2011 |
| TW | 201335840 | 9/2013 |

* cited by examiner

*Primary Examiner* — Kalpit Parikh
(74) *Attorney, Agent, or Firm* — Winston Hsu

(57) ABSTRACT

A method for adaptively managing a solid state drive (SSD), an associated apparatus, and an associated computer program product are provided, where the method includes the steps of: monitoring whether any deletion event regarding a file system established on the SSD exists, to selectively update a deletion amount accumulation value, where the deletion amount accumulation value represents a total deleted data amount of at least one deletion event of the file system; and after the deletion amount accumulation value reaches a predetermined deletion amount accumulation threshold value, sending at least one TRIM command to the SSD, to allow the SSD to recycle reusable storage space by utilizing a garbage collection mechanism of the SSD.

23 Claims, 3 Drawing Sheets

METHOD FOR ADAPTIVELY MANAGING A SOLID STATE DRIVE, AND ASSOCIATED APPARATUS AND ASSOCIATED COMPUTER PROGRAM PRODUCT

BACKGROUND OF THE INVENTION

1. Field of the Invention

The present invention relates to a TRIM control mechanism of a file system established on a solid state drive (SSD), and more particularly, to a method, an apparatus and a computer program product arranged for adaptively managing an SSD.

2. Description of the Prior Art

According to related arts, after a traditional solid state drive (SSD) has been used for a period of time, the access efficiency thereof will greatly drop due to the inherent characteristics of the SSD. To recover the desired access performance of the SSD, a garbage collection mechanism is usually utilized to recycle and re-use storage spaces. However, when files are deleted, only the metadata located in the upper layer, such as the file system layer, will be changed. In this situation, the lower layer of the SSD will not be informed. Hence, the storage space corresponding to the deleted data will not actually be recycled, this results in degraded access performance of the SSD.

In related arts, the TRIM command is used to solve the aforementioned issue. The TRIM command is a standard hard drive command. Through utilizing the TRIM command, when the file system deletes files, the SSD may be informed of which space is no longer used. Recently, due to the development of SSDs, most of current operating systems support the TRIM command. Two traditional schemes for issuing the TRIM command are introduced as follows.

Please refer to FIG. 1, which is a diagram illustrating a related art online issue scheme. The online issue scheme may be realized as: immediately sending a TRIM command sent to the SSD upon deletion of a file. For example, when a file with a size of 500K is deleted and a corresponding TRIM command is issued (denoted as "delete 500K" and "TRIM 500K," respectively, in FIG. 1, wherein K represents Kilobyte), then a file with a size of 5K is deleted and a corresponding TRIM command is issued (denoted as "delete 5K" and "TRIM 5K," respectively, in FIG. 1), then a file with a size of 1K is deleted and a corresponding TRIM command is issued (denoted as "delete 1K" and "TRIM 1K," respectively, in FIG. 1), then a file with a size of 5K is deleted and a corresponding TRIM command is issued (denoted as "delete 5K" and "TRIM 5K," respectively, in FIG. 1), and then a file with a size of 3K is deleted and a corresponding TRIM command is issued (denoted as "delete 3K" and "TRIM 3K," respectively, in FIG. 1). However, some side effects are introduced due to the online issue scheme. For example, the online issue scheme increases the system loading and affects the reading and writing performances. This is because sending the TRIM command will occupy the bandwidth of the SSD. Further, after the SSD receives the TRIM command, the garbage collection mechanism may be enabled. Hence, the online issue scheme will temporarily make the SSD have reading and writing performance drop.

Please refer to FIG. 2, which is a diagram illustrating a related art offline issue scheme. The offline issue scheme may be realized as: instead of immediately sending the TRIM command to the SSD upon deletion of a file, sending the TRIM command to the SSD afterwards. Specifically, according to the offline issue scheme, the TRIM commands are all issued at a predetermined time. For example, a file with a size of 500K is deleted (denoted as "delete 500K" in FIG. 2), then a file with a size of 5K is deleted (denoted as "delete 5K" in FIG. 2), then a file with a size of 1K is deleted (denoted as "delete 1K" in FIG. 2), then a file with a size of 5K is deleted (denoted as "delete 5K" in FIG. 2), and then a file with a size of 3K is deleted (denoted as "delete 3K" in FIG. 2). The conventional execution condition 10 is the current time equal to the aforementioned predetermined time, such as a scheduling time or a user-defined time, which is denoted as "scheduling time or user-defined time" in FIG. 2. However, the offline issue scheme will generate some problems such as some side effects. For example, the software module "fstrim" in the "Ubuntu" operating system may scan the whole file system when executed for the first time after the computer is powered on, in order to find all storage spaces with no valid data stored therein, and then issue the TRIM commands to all the found storage spaces with no valid data stored therein. However, the timing of performing the software module "fstrim" needs to be carefully considered. If it is performed based on a scheduling manner, the scan operation is not effective and increases the system loading when the data deletion amount is not large or even zero. If it is manually triggered by the user, the user may feel inconvenient. For another example, the "Android" operating system may try to issue the TRIM commands only when the device is charged through some mechanisms. More particularly, the frequency of issuing the TRIM command may be about once a day. However, the increased system loading resulting from performing the scan operation under the situation that the data deletion amount is not larger still exists.

In view of above, the traditional schemes cannot improve the access performance of the SSD without introducing side effects. Therefore, a novel method for improving the access performance of the SSD is needed.

SUMMARY OF THE INVENTION

Hence, an objective of the present invention is to provide a method, an apparatus and a computer program product, to solve the aforementioned problems.

Another objective of the present invention is to provide a method, an apparatus and a computer program product, to improve the performance of the SSD without generating side effects.

Another objective of the present invention is to provide a method, an apparatus and a computer program product, to improve the overall performance of an electronic device including the SSD inside.

In a preferred embodiment of the present invention, a method for adaptively managing a solid state drive (SSD) applied to an electronic device is provided. The method is applied to an electronic device, and the SSD is arranged in the electronic device. The method includes the following steps: monitoring whether any deletion event regarding a file system established on the SSD exists, to selectively update a deletion amount accumulation value, where the deletion amount accumulation value represents a total deleted data amount of at least one deletion event of the file system; and after the deletion amount accumulation value reaches a predetermined deletion amount accumulation threshold value, sending at least one TRIM command to the SSD, to allow the SSD to recycle reusable storage space by utilizing a garbage collection mechanism of the SSD. For example, the aforementioned at least one deletion event may include one or multiple deletion events of the file system.

Besides the above method, the present invention also correspondingly provides an apparatus for adaptively managing a solid state drive (SSD), where the apparatus includes at least a portion of an electronic device and arranged in the electronic device. The SSD is arranged in the electronic device, and the SSD is used to provide a data storage service to the electronic device. The apparatus includes an interface circuit and a processing circuit. The interface circuit is arranged for coupling to the SSD. The processing circuit is coupled to the SSD through the interface circuit, and arranged for controlling the operation of the electronic device and adaptively managing the SSD. Further, the processing circuit monitors whether any deletion event regarding a file system established on the SSD exists, to selectively update a deletion amount accumulation value, where the deletion amount accumulation value represents a total deleted data amount of at least one deletion event of the file system. Moreover, after the deletion amount accumulation value reaches a predetermined deletion amount accumulation threshold value, the processing circuit sends at least one TRIM command to the SSD, to allow the SSD to recycle reusable storage space by utilizing a garbage collection mechanism of the SSD. For example, the aforementioned at least one deletion event may include one or multiple deletion events of the file system.

Besides the above method, the present invention also correspondingly provides a computer program product, which includes a program code arranged to indicate at least one processing circuit to perform the above method.

One advantage provided by the present invention is that, compared with related art techniques, the method, apparatus and computer program product of the present invention may raise the performance of the SSD without generating side effects. Further, the method, apparatus and computer program product of the present invention may raise the overall performance of the electronic device without generating side effects. Moreover, compared with related art techniques, the method, apparatus and computer program product of the present invention may minimize the situation that the performance of the SSD drops due to frequently sending TRIM commands, and may determine an appropriately timing of issuing the TRIM commands, to avoid unnecessary system loadings.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
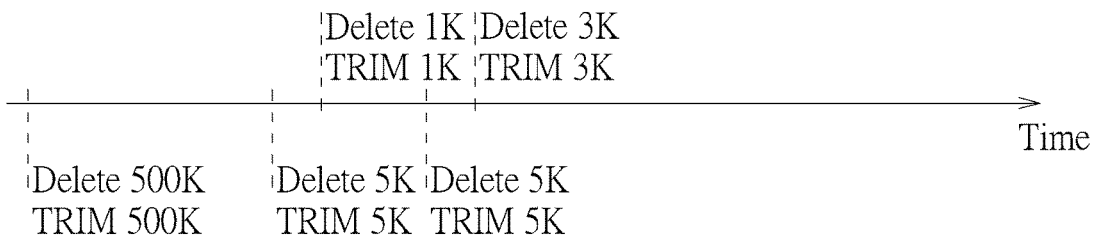
FIG. 1 is a diagram illustrating a related art online issue scheme.
Figure 2:
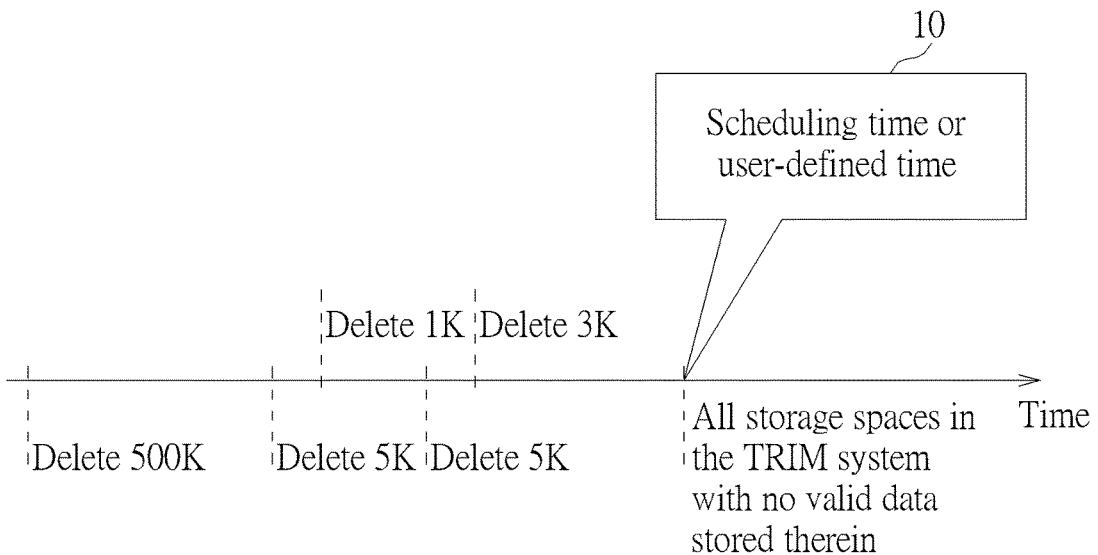
FIG. 2 is a diagram illustrating a related art offline issue scheme.
Figure 3:
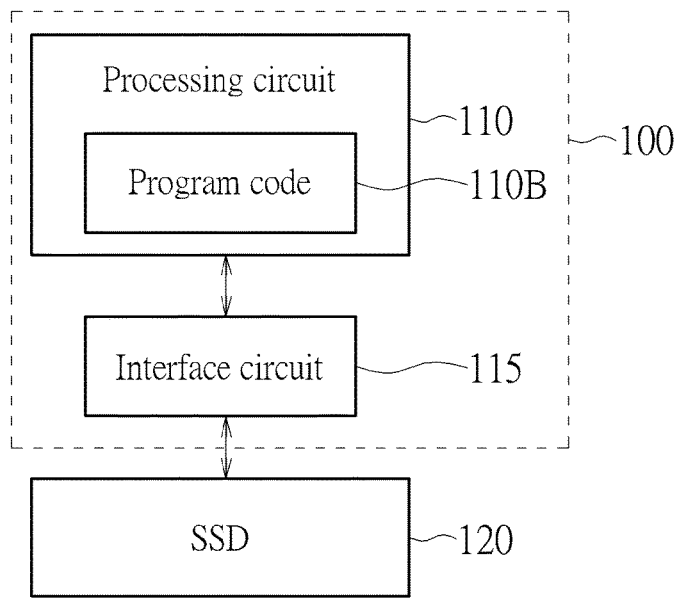
FIG. 3 is a diagram illustrating an apparatus for adaptively managing an SSD according to a first embodiment of the present invention.

FIG. 3 is a diagram illustrating an apparatus 100 for adaptively managing an SSD according to a first embodiment of the present invention, where the apparatus 100 may include a portion (e.g., part or all) of an electronic device. The SSD is positioned in the electronic device, and may be used to provide a data storage service to the electronic device. For example, the apparatus 100 may be a circuit system in the electronic device. For another example, the apparatus 100 may be the whole electronic device. The electronic device may be, but is not limited to, a server, a personal computer, a personal digital assistant (PDA), a mobile phone or a tablet. However, this is merely for illustrative purpose, and not meant to be a limitation to the present invention.

As shown in FIG. 3, the apparatus 100 may include a processing circuit 110 and an interface circuit 115. The processing circuit 110 and the interface circuit 115 are coupled to each other, where the solid state drive (SSD) 120 may be an example of the aforementioned SSD. In this embodiment, the interface circuit 115 is used to couple to the SSD 120. More particularly, the processing circuit 110 is coupled to the aforementioned SSD such as the SSD 120 through the interface circuit 115. However, this is merely for illustrative purpose, and not meant to be a limitation to the present invention. In some modifications of the embodiment, the apparatus 100 may include the aforementioned SSD such as the SSD 120. Further, in this embodiment, the processing circuit 110 may include at least one processor to execute a program code 110B, and the processing circuit 110 for executing the program code 110B is used for controlling the operation of the electronic device and adaptively managing the aforementioned SSD such as the SSD 120. More particularly, the processing circuit 110 includes an intelligent trim-control module (not shown in FIG. 3), arranged for adaptively managing the aforementioned SSD such as the SSD 120. For example, the intelligent trim-control module may be at least one program module in the program code 110B, such as at least one software module, where the program code 110B may represent a program executed in the electronic device (e.g., the aforementioned server, personal computer, personal digital assistant (PDA), mobile phone, or tablet). However, this is merely for illustrative purpose, and not meant to be a limitation to the present invention. According to some modifications of this embodiment, the program code 110B may be embedded in the processing circuit 110, and the intelligent trim-control module may be a hardware circuit, such as at least a portion (e.g., part or all) of the processing circuit.

According to this embodiment, the processing circuit 110 (especially the intelligent trim-control module) that executes the program code 110B may determine the timing for sending the TRIM command, to adaptively manage the file system established on the aforementioned SSD such as the SSD 120. For example, when the file system deletes files, the processing circuit 110 that executes the program code 110B may accumulate the data deletion amount to calculate the total deleted data amount, and trigger the transmission of the TRIM command only when the deleted data amount reaches a predetermined threshold. Hence, the processing circuit 110 that executes the program code 110B informs the SSD 120 through the TRIM command, to facilitate the SSD 120 to release corresponding inner storage space, thereby recovering the performance of the SSD 120. Hence, the apparatus 100 of the present invention is capable of avoiding the aforementioned problems in the related art, e.g., the performance drop of the SSD due to frequently sending the TRIM commands, and the increase of unnecessary system loading.

Figure 4:
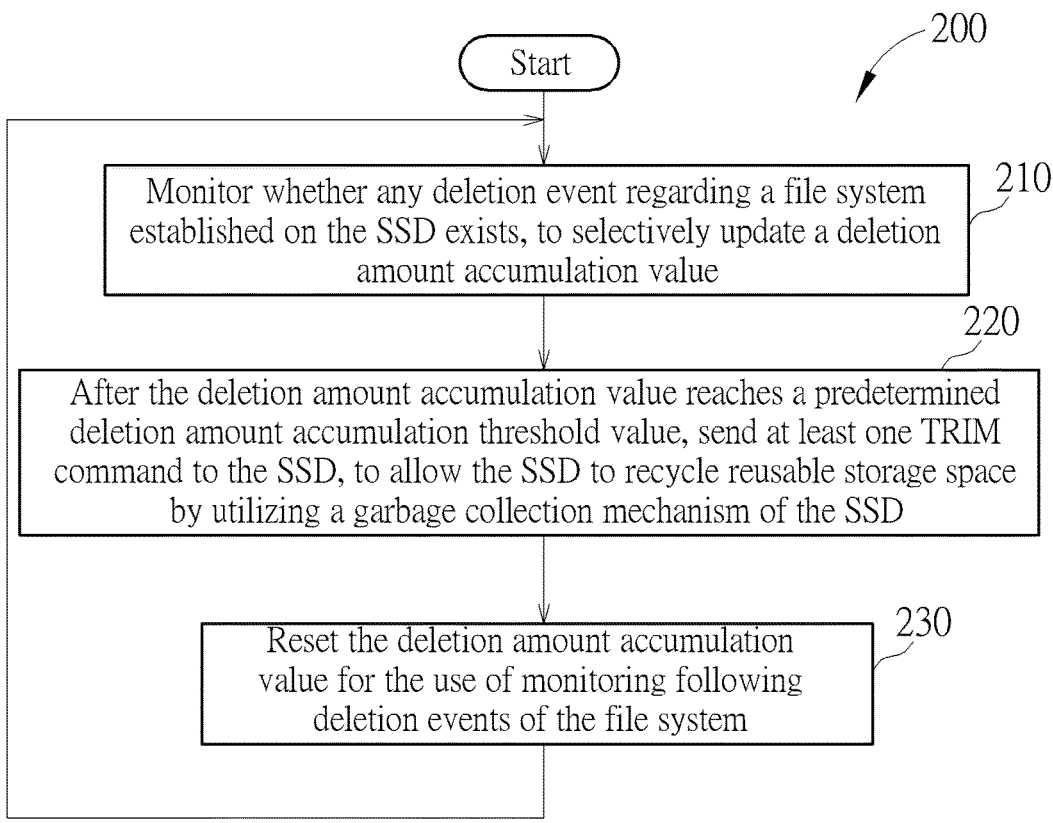
FIG. 4 is a flowchart illustrating a method for adaptively managing an SSD according to a first embodiment of the present invention.

FIG. 4 is a flowchart illustrating a method 200 for adaptively managing an SSD according to an embodiment of the present invention. The method 200 may be applied to the apparatus 100 shown in FIG. 3, and more particularly, to the aforementioned processing circuit 110, such as the processing circuit 110 which executes the program code 110B through the aforementioned at least one processor, where the SSD 102 may be an example of the aforementioned SSD. For example, through utilizing a computer program product, such as a CD-ROM storing the program code 110B, especially the installation version thereof, to indicate the aforementioned at least one processor to perform the method 200 shown in FIG. 4. Hence, the processing circuit 110 (especially the intelligent trim-control module) may control the operation of the electronic device to perform the method 200 shown in FIG. 4. However, this is merely for illustrative purpose, and not meant to be a limitation to the present invention. The method 200 is described as follows.

In step 210, the processing circuit 110 monitors whether any deletion event regarding a file system established on the SSD 120 exists, to selectively update a deletion amount accumulation value, where the deletion amount accumulation value represents a total deleted data amount of at least one deletion event of the file system. For example, when a specific deletion event is detected, the processing circuit 110 updates the deletion amount accumulation value according to the deleted data amount of the specific deletion event. More particularly, when the specific deletion event is detected, the processing circuit 110 accumulates the deleted data amount of the specific deletion event to the current deletion amount accumulation value, to update the deletion amount accumulation value. Hence, during the monitoring operation in step 210, the aforementioned at least one deletion event may include one or multiple deletion events of the file system, and the deletion amount accumulation value is equal to the summation of sizes of deleted data in the aforementioned one or multiple events.

In step 220, after the deletion amount accumulation value reaches a predetermined deletion amount accumulation threshold value (e.g., the aforementioned predetermined threshold), the processing circuit 110 sends at least one TRIM command (e.g., one or more TRIM commands) to the SSD 120, to allow the SSD 120 to recycle reusable storage space by utilizing a garbage collection mechanism of the SSD 120. For example, when the deletion amount accumulation value reaches the predetermined deletion amount accumulation threshold value, the processing circuit 110 determines whether the at least one TRIM command interferes with the performance of the electronic device. More particularly, when the at least one TRIM command is determined to not interfere with the performance of the electronic device, the processing circuit 110 immediately sends the at least one TRIM command to the SSD 120 to allow the SSD 120 to recycle reusable storage space by utilizing the garbage collection mechanism of the SSD 120. Otherwise, when the at least one TRIM command is determined to interfere with the performance of the electronic device, the processing circuit 110 delays the operation of sending the at least one TRIM command to the SSD 120, until the at least one TRIM command will not interfere with the performance of the electronic device.

In practice, the processing circuit 110 may determine whether the aforementioned at least one TRIM command interferes with the performance of the electronic device (especially the inner elements thereof, such as the aforementioned at least one processor) based on whether the electronic device is busy. For example, when the deletion amount accumulation value reaches the predetermined deletion amount accumulation threshold value, the processing circuit 110 immediately sends the at least one TRIM command to the SSD 120 to allow the SSD 120 to recycle reusable storage space by utilizing the garbage collection mechanism of the SSD 120 under a situation that a usage rate of a processor of the electronic device does not exceed a predetermined usage rate threshold value (e.g., 80%, 70%, or a specific value within 0%-100%), where this processor may be an example of the aforementioned at least one processor. However, this is merely for illustrative purpose, and not meant to be a limitation to the present invention. For another example, when the deletion amount accumulation value reaches the predetermined deletion amount accumulation threshold value, the processing circuit 110 immediately sends the at least one TRIM command to the SSD 120 to allow the SSD 120 to recycle reusable storage space by utilizing the garbage collection mechanism of the SSD 120 under a situation that a usage rate of the SSD 120 does not exceed another predetermined usage rate threshold value (e.g., 85%, 75%, or a specific value within 0%-100%). For yet another example, when the deletion amount accumulation value reaches the predetermined deletion amount accumulation threshold value, the processing circuit 110 immediately sends the at least one TRIM command to the SSD 120 to allow the SSD 120 to recycle reusable storage space by utilizing the garbage collection mechanism of the SSD 120 under a situation that a usage rate of the processor of the electronic device does not exceed a predetermined usage rate threshold value and a usage rate of the SSD 120 does not exceed another predetermined usage rate threshold value.

Please note that, the aforementioned predetermined usage rate threshold value is used to determine whether the processor of the electronic device is busy, and the aforementioned another predetermined usage rate threshold value is used to determine whether the SSD 120 is busy. In a typical situation, the predetermined usage rate threshold value and the other predetermined usage rate threshold value may be uncorrelated to each other. For example, the predetermined usage rate threshold value may be unequal to the predetermined usage rate threshold value. However, this is merely for illustrative purpose, and not meant to be a limitation to the present invention. According to a modification of this embodiment, the other predetermined usage rate threshold value may be equal to the predetermined usage rate threshold value. According to some modifications of this embodiment, the predetermined usage rate threshold value may be correlated to the other predetermined usage rate threshold value.

In step 230, after sending the aforementioned at least one TRIM command to the SSD 120, the processing circuit 110 resets the deletion amount accumulation value for the use of monitoring following deletion events of the file system. For example, the processing circuit 110 may reset the deletion amount accumulation value to 0. In practice, the processing circuit 110 may reset a parameter temporarily used to store the deletion amount accumulation value to 0.

According to this embodiment, the processing circuit 110 may determine whether the aforementioned at least one TRIM command interferes with the performance of the electronic device based on whether the electronic device (more particularly, the inner elements thereof, such as the aforementioned at least one processor) is busy, and refer to the judgment result to determine whether to delay the operation of sending the aforementioned at least one TRIM command to the SSD 120. However, this is merely for illustrative purpose, and not meant to be a limitation to the present invention. According to some modifications of this embodiment, when the deletion amount accumulation value reaches the predetermined deletion accumulation threshold value, the processing circuit 110 immediately sends the aforementioned at least one TRIM command to the SSD 120 to allow the SSD 120 to recycle reusable storage space by utilizing the garbage collection mechanism of the SSD 120. That is, in these modifications, before sending the aforementioned at least one TRIM command to the SSD 120, the processing circuit 110 does not need to determine whether the aforementioned at least one TRIM command interferes with the performance of the electronic device in advance.

Figure 5:
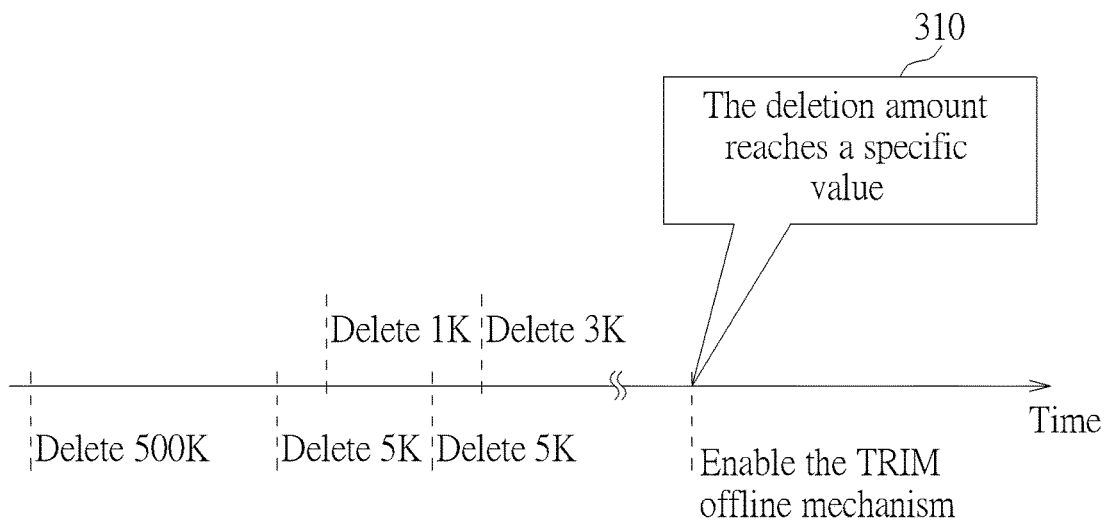
FIG. 5 is a diagram illustrating a control scheme involved by the method shown in FIG. 4 according to an embodiment of the present invention.

Please refer to FIG. 5, which is a diagram illustrating a control scheme involved by the method 200 shown in FIG. 4 in an embodiment. For example, a file with a size of 500K is deleted (denoted as "delete 500K" in FIG. 5), then a file with a size of 5K is deleted (denoted as "delete 5K" in FIG. 5), then a file with a size of 1K is deleted (denoted as "delete 1K" in FIG. 5), then a file with a size of 5K is deleted (denoted as "delete 5K" in FIG. 5), and then a file with a size of 3K is deleted (denoted as "delete 3K" in FIG. 5). According to this embodiment, the execution condition 310 of the control scheme is that the deletion amount accumulation value reaches the predetermined deletion accumulation threshold value (denoted as "the deletion amount reaches a specific value" in FIG. 5), where the deletion amount accumulation value is simplified as "deletion amount," and "a specific value" shown in FIG. 5 may be viewed as an example of the predetermined deletion amount accumulation threshold value. Hence, when the execution condition 310 of the control scheme is satisfied, the processing circuit 110 (especially the intelligent trim-control module) that executes the program code 110B will enable the TRIM offline mechanism of the embodiment (or a modification thereof) shown in FIG. 4.

In practice, the processing circuit 110 (especially the intelligent trim-control module) that executes the program code 110B may utilize the SSD 10 to store the latest value of the deletion amount accumulation value, in order to obtain a sum of sizes of deleted files in aforementioned one or more deletion events (e.g., a sum of sizes of files that are already deleted). More particularly, the deletion amount accumulation value may be stored in a block of the SSD 120. However, this is merely for illustrative purpose, and not meant to be a limitation to the present invention.

Further, the processing circuit 110 (especially the intelligent trim-control module) that executes the program code 110B may preset the deletion amount accumulation threshold value to the size of the over-provisioning block of the SSD 120. In practice, the space of the aforementioned over-provisioning block equals the actual capacity in the SSD 120 minus the useable capacity for users. The space of the over-provisioning block may be reserved for the SSD 120 to use when the SSD 120 performs some background tasks (or background operations), where the aforementioned background tasks may include operations such as overwriting and garbage recycling. For example, when the over-provisioning block is exhausted, thus lacking sufficient storage space for the SSD 120 to perform the aforementioned background operation, the operation speed of the SSD 120 will become lower in typical conditions. Hence, in a case where the processing circuit 110 (especially the intelligent trim-control module) that executes the program code 110B presets the predetermined deletion amount accumulation threshold value to the size of the over-provisioning block, after the processing circuit 110 issues the TRIM command to the SSD 120, the SSD 120 may release a space with a size equal to that of the over-provisioning block, thus enhancing the performance of the SSD 120. However, this is merely for illustrative purpose, and not meant to be a limitation to the present invention. For example, based on the default setting or the user-defined setting, the processing circuit 110 (especially the intelligent trim-control module) that executes the program code 110B may set the predetermined deletion amount accumulation threshold value by a fixed value (e.g., 10% of the capacity of the SSD 120, 20% of the capacity of the SSD 120, or a ratio between 0%-100% multiplied by the capacity of the SSD 120).

Figure 6:
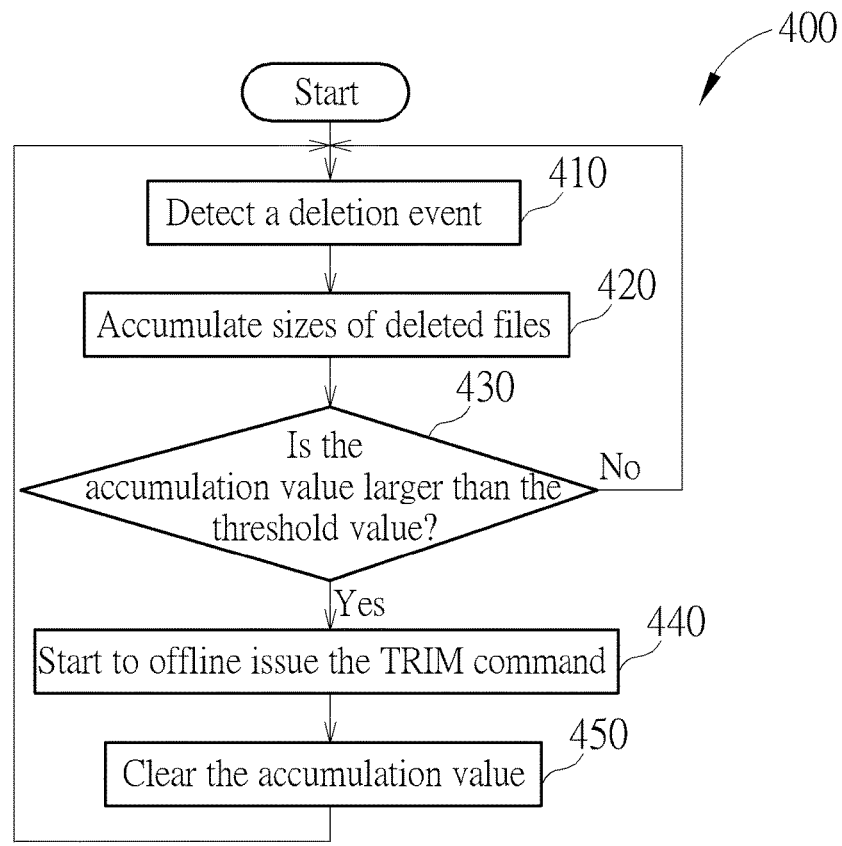
FIG. 6 is a diagram illustrating an operation procedure involved by the control scheme shown in FIG. 5 according to an embodiment of the present invention.

Please refer to FIG. 6, which is a diagram illustrating an operation procedure 400 involved by the control scheme shown in FIG. 5 according to an embodiment of the present invention.

In step 410, the processing circuit 110 detects a deletion event. For example, this deletion event may be the aforementioned specific deletion event.

In step 420, the processing circuit 110 accumulates sizes of deleted files. For example, in a case where the deletion event mentioned in step 410 is the aforementioned specific deletion event, the processing circuit 110 updates the deletion amount accumulation value according to the deletion data amount of the specific deletion event. Specifically, when the specific deletion event is detected, the processing circuit 110 accumulates/adds the deletion data amount of the specific deletion event to the current deletion amount accumulation value, to update the deletion amount accumulation value.

In step 430, the processing circuit 110 checks whether the corresponding accumulation value (i.e., the latest accumulation value obtained from the accumulation operation in step 420) is larger than the aforementioned predetermined threshold value (denoted as "threshold value" in FIG. 6), where the accumulation value may be an example of the aforementioned deletion amount accumulation value, and the predetermined threshold value may be an example of the aforementioned predetermined deletion accumulation threshold value. When the accumulation value is detected to be larger than the predetermined threshold value, the flow goes to step 440; otherwise, the flow goes to step 410 again.

In step 440, the processing circuit 110 starts to offline issue the TRIM command.

In step 450, the processing circuit 110 clears the accumulation value, wherein the accumulation value may be an example of the aforementioned deletion amount accumulation value. In practice, the processing circuit 110 may reset the parameter utilized to temporarily store the deletion amount accumulation value (such as the accumulation value) to zero. After the step 450 is completed, the flow goes to step 410 again.

In practice, when performing step 440 (e.g., the operation of offline issuing the TRIM command to the SSD 120), the processing circuit 110 may first re-scan the whole file system to determine the logical block addresses (LBAs) in the file system that have no files, and then issue the TRIM commands to the SSD 120 for all of the LBAs having no files. However, this is merely for illustrative purpose, and not meant to be a limitation to the present invention. According to some embodiments of the present invention such as some modifications of the embodiment shown in FIG. 4, when updating the deletion amount accumulation value, the processing circuit 110 may record LBAs of the deleted files for the use of sending the aforementioned at least one TRIM command. Specifically, according to some modifications of the embodiments shown in FIGS. 5 and 6, the processing circuit 110 may record the LBAs of the deleted files while performing the deletion amount accumulation. When issuing the TRIM commands in a later step, the processing circuit 110 may directly check recorded LBAs. For example, when it is detected that certain LBA currently still has no data, the processing circuit 110 may focus on this LBA to issue the TRIM command to the SSD 120. In this way, when the operation in step 440 is performed, the time for scanning the entire file system may be saved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for adaptively managing a solid state drive (SSD), the method comprising following steps:
   monitoring, by a processing circuit of an electronic device, whether any deletion event regarding a file system established on the SSD exists, to selectively update a deletion amount accumulation value, wherein the deletion amount accumulation value is a total deleted data amount of at least one deletion event of the file system; and
   sending at least one TRIM command, by the processing circuit, to the SSD after the deletion amount accumulation value reaches a predetermined deletion amount accumulation threshold value, to allow the SSD to recycle reusable storage space by utilizing a garbage collection mechanism of the SSD;
   wherein the SSD is positioned in another electronic device external to the electronic device, and the method is executed by the electronic device.

2. The method of claim 1, wherein the step of monitoring whether any deletion event regarding the file system established on the SSD exists to selectively update the deletion amount accumulation value further comprises:
   updating the deletion amount accumulation value according to a deleted data amount of the specific deletion event when a specific deletion event is detected.

3. The method of claim 2, wherein the step of monitoring whether any deletion event regarding the file system established on the SSD exists to selectively update the deletion amount accumulation value further comprises:
   accumulating the deleted data amount of the specific deletion event to the deletion amount accumulation value to update the deletion amount accumulation value when the specific event is detected.

4. The method of claim 1, wherein the step of sending the at least one TRIM command to the SSD to allow the SSD to recycle reusable storage space by utilizing the garbage collection mechanism of the SSD further comprises:
   determining whether the at least one TRIM command interferes with performance of the electronic device when the deletion amount accumulation value reaches the predetermined deletion amount accumulation threshold value; and
   immediately sending the at least one TRIM command to the SSD when the at least one TRIM command is determined to not interfere with the performance of the electronic device, to allow the SSD to recycle reusable storage space by utilizing the garbage collection mechanism of the SSD.

5. The method of claim 4, wherein the step of sending the at least one TRIM command to the SSD to allow the SSD to recycle reusable storage space by utilizing the garbage collection mechanism of the SSD further comprises:
   immediately sending the at least one TRIM command to the SSD under a situation that a usage rate of a processor of the electronic device does not exceed a predetermined usage rate threshold value when the deletion amount accumulation value reaches the predetermined deletion amount accumulation threshold value, to allow the SSD to recycle reusable storage space by utilizing the garbage collection mechanism of the SSD.

6. The method of claim 4, wherein the step of sending the at least one TRIM command to the SSD to allow the SSD to recycle reusable storage space by utilizing the garbage collection mechanism of the SSD further comprises:
   immediately sending the at least one TRIM command to the SSD under a situation that a usage rate of the SSD does not exceed a predetermined usage rate threshold value when the deletion amount accumulation value reaches the predetermined deletion amount accumulation threshold value, to allow the SSD to recycle reusable storage space by utilizing the garbage collection mechanism of the SSD.

7. The method of claim 4, wherein the step of sending the at least one TRIM command to the SSD to allow the SSD to recycle reusable storage space by utilizing the garbage collection mechanism of the SSD further comprises:
   delaying an operation of sending the at least one TRIM command to the SSD when the at least one TRIM command is determined to interfere with the performance of the electronic device, until the at least one TRIM command does not interfere with the performance of the electronic device.

8. The method of claim 1, wherein the step of sending the at least one TRIM command to the SSD to allow the SSD to recycle reusable storage space by utilizing the garbage collection mechanism of the SSD further comprises:
   immediately sending the at least one TRIM command to the SSD when the deletion amount accumulation value reaches the predetermined deletion amount accumulation threshold value, to allow the SSD to recycle reusable storage space by utilizing the garbage collection mechanism of the SSD.

9. The method of claim 1, further comprising:
   resetting the deletion amount accumulation value for the use of monitoring following deletion events of the file system after sending the at least one TRIM command to the SSD.

10. The method of claim 1, further comprising:
    recording positions of deleted files for the use of sending the at least one TRIM command when updating the deletion amount accumulation value.

11. A non-transitory computer readable medium, storing a program code arranged to instruct at least one processing circuit to perform the method of claim 1.

12. An apparatus for adaptively managing a solid state drive (SSD), the apparatus comprising at least a portion of an electronic device, the SSD positioned in the electronic device and used for providing a data storage service to the electronic device, the apparatus comprising:
    an interface circuit, arranged for coupling to the SSD; and a processing circuit, coupled to the SSD through the interface circuit, the processing circuit arranged for controlling an operation of the electronic device and adaptively managing the SSD, wherein the processing circuit monitors whether any deletion event regarding a file system established on the SSD exists, to selectively update a deletion amount accumulation value, wherein the deletion amount accumulation value is a total deleted data amount of at least one deletion event of the file system;

wherein after the deletion amount accumulation value reaches a predetermined deletion amount accumulation threshold value, the processing circuit sends at least one TRIM command to the SSD, to allow the SSD to recycle reusable storage space by utilizing a garbage collection mechanism of the SSD.

13. The apparatus of claim 12, wherein when a specific deletion event is detected, the processing circuit updates the deletion amount accumulation value according to a deleted data amount of the specific deletion event.

14. The apparatus of claim 13, wherein when the specific deletion event is detected, the processing circuit accumulates the deleted data amount of the specific deletion event to the deletion amount accumulation value, to update the deletion amount accumulation value.

15. The apparatus of claim 12, wherein when the deletion amount accumulation value reaches the predetermined deletion amount accumulation threshold value, the processing circuit determines whether the at least one TRIM command interferes with performance of the electronic device; and when the at least one TRIM command is determined to not interfere with the performance of the electronic device, the processing circuit immediately sends the at least one TRIM command to the SSD, to allow the SSD to recycle reusable storage space by utilizing the garbage collection mechanism of the SSD.

16. The apparatus claim 15, wherein when the deletion amount accumulation value reaches the predetermined deletion amount accumulation threshold value, the processing circuit immediately sends the at least one TRIM command to the SSD under a situation that a usage rate of a processor of the electronic device does not exceed a predetermined usage rate threshold value, to allow the SSD to recycle reusable storage space by utilizing the garbage collection mechanism of the SSD.

17. The apparatus of claim 15, wherein when the deletion amount accumulation value reaches the predetermined deletion amount accumulation threshold value, the processing circuit immediately sends the at least one TRIM command to the SSD under a situation that a usage rate of the SSD does not exceed a predetermined usage rate threshold value, to allow the SSD to recycle reusable storage space by utilizing the garbage collection mechanism of the SSD.

18. The apparatus of claim 15, wherein when the at least one TRIM command is determined to interfere with the performance of the electronic device, the processing circuit delays an operation of sending the at least one TRIM command to the SSD, until the at least one TRIM command does not interfere with the performance of the electronic device.

19. The apparatus of claim 12, wherein when the deletion amount accumulation value reaches the predetermined deletion amount accumulation threshold value, the processing circuit immediately sends the at least one TRIM command to the SSD, to allow the SSD to recycle reusable storage space by utilizing the garbage collection mechanism of the SSD.

20. The apparatus of claim 12, wherein after sending the at least one TRIM command to the SSD, the processing circuit resets the deletion amount accumulation value for the use of monitoring following deletion events of the file system.

21. The apparatus of claim 12, wherein when updating the deletion amount accumulation value, the processing circuit records positions of deleted files for the use of sending the at least one TRIM command.

22. A method for adaptively managing a solid state drive (SSD), the method applied to an electronic device, the SSD positioned in the electronic device, the method comprising following steps:

monitoring, by a processing circuit of the electronic device, whether any deletion event regarding a file system established on the SSD exists, to selectively update a deletion amount accumulation value, wherein the deletion amount accumulation value is a total deleted data amount of at least one deletion event of the file system; and sending at least one TRIM command, by the processing circuit, to the SSD after the deletion amount accumulation value reaches a predetermined deletion amount accumulation threshold value, to allow the SSD to recycle reusable storage space by utilizing a garbage collection mechanism of the SSD;

wherein the method is executed by the electronic device.

23. An apparatus for adaptively managing a solid state drive (SSD), the apparatus comprising:

an electronic device external to the SSD, wherein the electronic device comprises:

an interface circuit, arranged for coupling to the SSD; and a processing circuit, coupled to the SSD through the interface circuit, the processing circuit arranged for controlling an operation of the electronic device and adaptively managing the SSD, wherein the processing circuit monitors whether any deletion event regarding a file system established on the SSD exists, to selectively update a deletion amount accumulation value, wherein the deletion amount accumulation value is a total deleted data amount of at least one deletion event of the file system;

wherein after the deletion amount accumulation value reaches a predetermined deletion amount accumulation threshold value, the processing circuit sends at least one TRIM command to the SSD, to allow the SSD to recycle reusable storage space by utilizing a garbage collection mechanism of the SSD; and the SSD is positioned in another electronic device being external to the electronic device.

* * * * *